(12) United States Patent
Mishra

(10) Patent No.: US 11,551,096 B1
(45) Date of Patent: Jan. 10, 2023

(54) AUTOMATED DESIGN TECHNIQUES

(71) Applicant: Amazon Technologies, Inc., Seattle, WA (US)

(72) Inventor: Pragyana K. Mishra, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1176 days.

(21) Appl. No.: 16/046,294

(22) Filed: Jul. 26, 2018

(51) Int. Cl.
*G06N 3/08* (2006.01)
*G06N 3/04* (2006.01)
*G06Q 30/06* (2012.01)

(52) U.S. Cl.
CPC .......... *G06N 3/086* (2013.01); *G06N 3/0445* (2013.01); *G06Q 30/0609* (2013.01); *G06Q 30/0631* (2013.01)

(58) Field of Classification Search
CPC .............................. G06N 3/0445; G06N 3/086
See application file for complete search history.

(56) References Cited

U.S. PATENT DOCUMENTS

| | | | | |
|---|---|---|---|---|
| 2005/0096873 A1* | 5/2005 | Klein | ...................... | G01H 1/006 702/184 |
| 2010/0057410 A1* | 3/2010 | Yanami | ................... | G06F 30/00 703/2 |
| 2019/0026430 A1* | 1/2019 | Grouchy | ................ | G06N 20/00 |

OTHER PUBLICATIONS

Wang et al. (Mapping customer needs to design parameters in the front end of product design by applying deep learning, Apr. 2018, pp. 145-148) (Year: 2018).*
Ireland et al. (Application of data analytics for product design: Sentiment analysis of online product reviews, Jul. 17, 2018, pp. 128-144) (Year: 2018).*
Baktha et al. (Investigation of Recurrent Neural Networks in the field of Sentiment Analysis, Apr. 2017, pp. 2047-2050) (Year: 2017).*
Glowacka et al. (Directing exploratory search: reinforcement learning from user interaction with keywords, Mar. 2013, pp. 117-128) (Year: 2013).*
Tucker et al. (Predicting Emerging Product Design Trend By Mining Publicly Available Customer Review Data, Dec. 2011, pp. 1-10) (Year: 2011).*

* cited by examiner

*Primary Examiner* — George Giroux
(74) *Attorney, Agent, or Firm* — Kilpatrick Townsend & Stockton LLP

(57) ABSTRACT

Systems and methods are described herein for generating potential feature combinations for a new item. A neural network may be utilized to identify positive and/or negative sentiment phrases from textual data. Each sentiment phrase may correspond to particular features of existing items. A machine-learning model may utilize the sentiment phrases and their corresponding features to generate a set of potential feature combinations for a new item. The potential feature combinations may be scored, for example, based on an amount by which a potential feature combination differs from known feature combinations of existing items. One or more potential feature combinations may be provided in a feature recommendation. Feedback (e.g., human feedback, sales data, page views for similar items, and the like) may be obtained and utilized to retrain the machine-learning model to better identify subsequent feature combinations that may be desirable and/or practical to manufacture.

19 Claims, 9 Drawing Sheets

AUTOMATED DESIGN TECHNIQUES

BACKGROUND

Various products are designed and produced by competing manufacturers. Each product design may offer several common and/or disparate features, both in form and functionality. Currently, a design process is performed by experienced product managers and designers who may leverage their background to attempt to predict consumer response to a combined set of features to offer in a new product. These efforts may include utilizing consumer surveys, market research, user studies, and/or tribal knowledge and experiences. The product design process presents drawbacks with respect to scalability, efficiency, and throughput. Embodiments of the invention discussed herein address these and other problems, individually and collectively.

BRIEF DESCRIPTION OF THE DRAWINGS

Various embodiments in accordance with the present disclosure will be described with reference to the drawings, in which.

DETAILED DESCRIPTION

Figure 1:
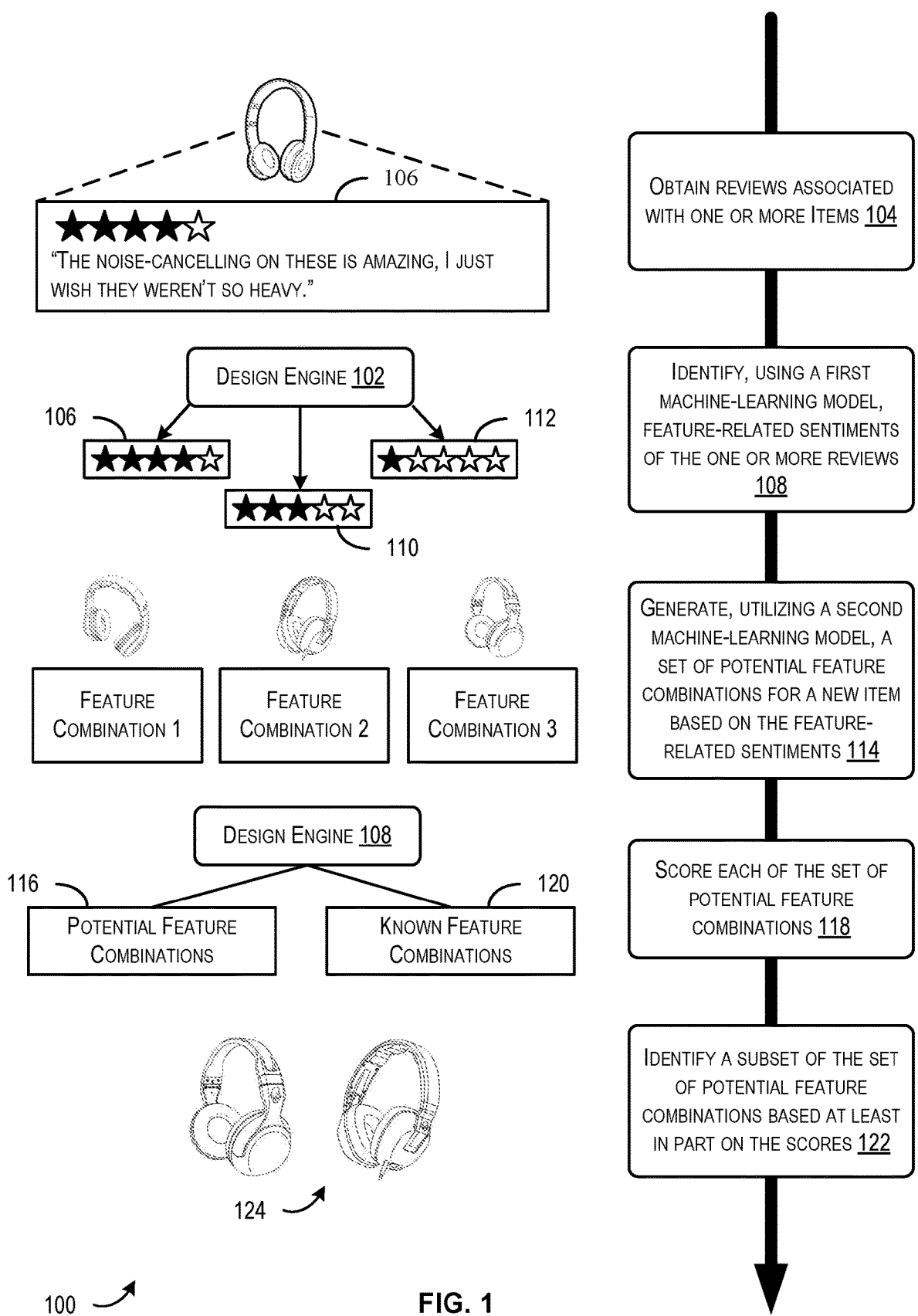
FIG. 1 illustrates a flow for identifying potential design feature combinations utilizing a design engine, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to identifying potential designs for an item. In some embodiments, a user/designer may utilize a user interface provided by a design engine to identify an item and/or a category and/or subcategory of an item. For example, the user may input in a user interface element the words "wireless headphones." The design engine may be operated by, or on behalf of, a service provider which implements an electronic marketplace that hosts electronic content in the form of an electronic catalog. Upon receiving the user input, the design engine may be configured to obtain historical information including, but not limited to, consumer reviews associated with one or more items (e.g., known wireless headphones) that were provided via the electronic marketplace (or in some cases, from a third-party source), online blogs, social media posts/text from one or more social media platforms, online articles, or any suitable electronic content. Although examples herein are provided in reference to items, it should be appreciated that similar concepts may be utilized in other contexts such as determining improvements to a service (e.g., a software service).

Once obtained, the design engine may analyze the historical information to identify positive and negative sentiment phrases. A "sentiment phrase" is intended to refer to one or more words that express an attitude, thought, or judgment prompted by an emotion. Positive sentiment phrases such as "great sound!" or "awesome product," may indicate that the speaker is pleased with an item and/or one or more features of the item." Conversely, negative sentiment phrases such as "poor battery life," or "it broke on the first day!" may indicate that the speaker is displeased with the item and/or one or more features of the item.

In some embodiments, the positive and negative sentiment phrases may be identified using a recurrent neural network based language model (herein also referred to as a "sentiment model"). A "recurrent neural network" (RNN) is a class of artificial neural networks where connections between nodes of the network form a direct graph along a sequence. Unlike feed forward neural networks, RNNs can use an internal state (e.g., memory) to process sequences of inputs. It should be appreciated that the use of the recurrent neural network described herein is intended to be illustrative in nature and is not intended to limit the scope of the disclosure. It is contemplated that other types of neural networks (e.g., non-recurrent) and/or machine learning techniques (e.g., regression algorithms, random forest algorithms, genetic algorithms, classification algorithms, and the like) may be utilized to identify positive and/or negative sentiment phrases or likewise, any suitable language processing techniques for that matter.

The identified positive and negative sentiment phrases may be scored (e.g., by the design engine, as part of the output received from the sentiment model, etc.) such that a set of top-scoring positive sentiment phrases and a set of top-scoring negative phrases may be identified. Each top-scoring set may include every identified positive or negative sentiment phrase or each top-scoring set may include a subset of every identified positive or negative sentiment phrases (e.g., the top 20, the top 5, etc.). A "top score" can refer to a highest score or lowest score (depending on the particular scoring algorithm utilized) that indicates the positive or negative sentiment phrase (or a similar phrase related to a same or similar feature) occurs more often than other sentiment phrases. In some embodiments, the score may additionally or alternatively indicate that the positive or negative sentiment phrase relates to a more significant feature than other features of the item (e.g., the sentiment phrase relates to a higher ranked feature of a predetermined feature ranking).

In some embodiments, sentiment phrases may be mapped to particular features of a given item or set of items. By way of example, given the user input of "wireless headphones"

a feature set may be identified by the design engine. This feature set may include a superset of all known features associated with "wireless headphones." Some example features of "wireless headphones" may include "battery life," "Bluetooth® capabilities," "method for charging the battery," "replaceable battery," "range," "sound quality," "folding design," "sweat resistant," "ear pad size," "ear pad style," "platforms supported," "weight," "price," "noise-cancelling," "durability," "microphone," and the like. These features may be identified through obtaining attributes that are associated with a particular item (e.g., a particular model of wireless headphone manufactured by a particular manufacturer). The attributes may be identified from a catalog listing of the item associated with the electronic marketplace, from third-party electronic marketplace listings, from item information (e.g., attributes associated with an item or a similar item) and/or content data (e.g., textual data related to an item or a similar item) obtained from a third-party source (e.g., a consumer review), from social media posts, or any suitable electronic content from which an association between a feature and an item/category of items may be identified.

As part of the sentiment phrase identification process, or subsequent to that process, phrases which do not pertain to features of the identified item and/or category/subcategory of items may be discarded or otherwise filtered from a candidate set of sentiment phrases. That is, the resultant top-scored set of positive sentiments and the set of top-scored negative sentiments may include sentiments that relate to at least one feature in the feature set and exclude sentiments that do not relate to a feature of the feature set.

The set of top-scored positive sentiments and the set of top-scored negative sentiments may be provided as input into a machine-learning model (referred to as a "design model"). The machine-learning model may utilize any suitable exploration/exploitation algorithm (e.g., a multi-armed bandit algorithm) to identify a set of potential feature combinations. An exploration/exploitation algorithm may be configured to utilize a set of resources (e.g., sentiment phrases associated with one or more features) to identify any suitable number of potential feature combinations that maximize an expected gain. The design model may access the feature set associated with the item and/or item category and/or the design model may receive the feature set as input with the sets of top-scored positive/negative sentiment phrases. In some embodiments, the design model may be configured to provide as output one or more potential feature combinations. These feature combinations may be ranked according to scores assigned by the design model. Further description of these scores will be discussed in further detail below. One or more top-scored (e.g., highest ranked) feature combinations may be provided by the design engine via an electronic recommendation. This electronic recommendation may be conveyed via any suitable electronic means to the user (e.g., via text messaging, email, or the like) and/or one or more user interfaces provided by the design engine (e.g., a user interface presented via an application operating on the user's mobile phone, desktop, or the like).

Additionally, or alternatively, the electronic recommendation may be provided to one or more users and/or one or more remote systems (e.g., design systems, manufacturing systems, crowdsource systems, etc.). The design model may be improved over time utilizing reinforced learning techniques. By way of example, a recommended feature combination may be submitted to a crowdsource system to illicit feedback regarding whether or not users would purchase an item having the recommended feature combination. Such crowdsource feedback may be utilized to retrain the design model to identify rules for determining when particular combinations of two or more features are likely to be desirable and/or when particular combinations of two or more features are likely to be undesirable. Utilizing crowdsource data for reinforced learning purposes is intended to be illustrative in nature and is not intended to limit the scope of this disclosure. It is contemplated that any suitable electronic content, such as sales data of an item previously and/or subsequently manufactured that includes at least some of the features of the recommended feature combination, navigation data of the electronic marketplace or a third-party website associated with an item that includes at least some of the features of the recommended feature combination, consumer reviews associated with an item that includes at least some of the features of the recommended feature combination, and the like.

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates a flow 100 for identifying potential product design features utilizing a design engine 102, in accordance with at least one embodiment. At 104, the design engine 102 (or any suitable system or component) may obtain one or more reviews associated with one or more items. As a non-limiting example, the design engine 102 may be configured to identify reviews associated with a particular item (e.g., wireless headphone X, manufactured by manufacturer M) and/or a category or subcategory of items (e.g., "wireless headphones," "sound producing electronics," "speakers," or the like). Such reviews may be obtained from any suitable data store accessible to the design engine 102 and/or the design engine 102 may be configured to obtain these reviews from any suitable combination of: one or more electronic marketplaces, articles, blogs, social media platforms/posts, and/or any suitable electronic content. Although "reviews" are utilized in this example, it should be appreciated that any suitable electronic text and/or images may be utilized. The obtained reviews may include, for example, review 106 which includes the text "the noise-cancelling on these is amazing, I just wish they weren't so heavy." Any suitable number of reviews may be obtained from any suitable number of sources.

At 108, feature-related sentiments of the one or more reviews may be identified (e.g., by the design engine 102). The feature-related sentiments can include positive and/or negative sentiment phrases. In some embodiments, these feature-related sentiments may be identified utilizing a first machine-learning model (e.g., a sentiment model). The first machine-learning model may utilize a recurrent neural network (RNN) or any suitable machine-learning techniques (e.g., regression analysis, random forest algorithms, and the like) to identify sentiment phrases.

By way of example, the first machine-learning model may be previously trained from historical information (e.g., past reviews, articles, blogs, and the like) to identify positive and/or negative sentiment phrases related to particular features of an item and/or the first machine-learning model may be trained to identify positive/negative sentiment phrases in general. By way of example, reviews 106, 110, and 112 may be identified and submitted as input into the first machine-learning model which may provide output identifying one or more positive and/or negative sentiment phrases (one or more word phrases) contained in at least one of the reviews 106, 110, and/or 112. As a non-limiting example, the machine-learning model may identify a positive sentiment phrase "the noise-cancelling on these is amazing" from review 106 as well as a negative sentiment phrase "I just wish they weren't so heavy." Additional positive and/or negative sentiment phrases may be similarly identified from reviews 110 and 112. In some examples, a review may contain one or more sentiment phrases (with positive and/or negative polarity), while in other examples, no sentiment phrases may be identified from the review.

In some embodiments, the first machine-learning model may sort the identified sentiment phrases into a positive set of sentiment phrases and a negative set of sentiment phrases. As part of the identification process, the first machine-learning model may filter out sentiment phrases that are unlikely to relate to a particular feature associated with an item and/or an item category/subcategory. By way of example, a feature set may be provided as input for the first machine-learning model. The feature set could include a mapping of a set of features to words and/or phrases that likely correspond to one or more features of the set. The first machine-learning model may be configured to determine a similarity score between the words/phrases contained in the sentiment phrase to words/phrases associated with one or more features of the feature set. If the similarity score for a particular sentiment exceeds a threshold value, the sentiment may be deemed to be related to a particular combination of one or more features. If the sentiment phrase does receive a similarity score exceeding the threshold value, the sentiment may be deemed to be unrelated to the one or more features. Sentiment phrases for which similarity scores do not indicate at least one relationship with at least one feature may be discarded or otherwise ignored for future processing purposes.

In some embodiments, the first machine-learning model may identify features related to each sentiment phrase as part of its output. For example, the first machine-learning model may output a mapping of positive sentiment phrases and their corresponding related features and a mapping of negative sentiment phrases and their corresponding related features. In some embodiments, such information may be provided in a single mapping of feature-related sentiment phrases (either positive or negative) to corresponding related sets of one or more features. It should be appreciated that in other embodiments, relationships between sentiment phrases and one or more features may be determined by a component of the design engine 102 subsequent to receiving a set of feature-related sentiment phrases from the first machine-learning model. Thus, in some embodiments, a component of the design engine 102, rather than the first machine-learning model, may filter out sentiment phrases that are unlikely to relate to features of the feature set.

At 114, a set of potential feature combinations 116 (e.g., including feature combinations 1-N) may be generated for a new item based (at least in part) on the feature-related sentiments and/or the features to which the feature-related sentiments relate. This set may include any suitable number of potential feature combinations. In some embodiments, the set of potential feature combinations 116 may be generated utilizing a second machine-learning model (e.g., a design model). The second machine-learning model may utilize any suitable exploration/exploitation algorithm (e.g., a multi-armed bandit algorithm) to generate the various combinations of the set of potential feature combinations 116. In some embodiments, the second machine-learning model may be configured to utilize both positive and negative sentiment phrases in determining these combinations. In some embodiments, the second machine-learning model may be previously trained on historical information that indicates acceptable and unacceptable combinations of features. As a non-limiting example, the historical information may include reviews, articles, blogs, sales data, marketing data, and the like that indicates that particular feature combinations which have been found to be desirable (as indicated by sales data, reviews, articles, and the like) in the past and/or particular feature combinations which have been found to be undesirable in the past (as indicated by sales data, reviews, articles, and the like).

At 118, a score for each combination of the set of potential feature combinations 116 may be generated by comparing a potential feature combination to a set of known feature combinations (e.g., associated with existing items). By way of example, the second machine-learning model (or a component of the design engine 102) may be configured to score each combination of the set of potential feature combinations 116 according to a degree of A-typicality with respect to a set of known feature combinations 120. The set of known feature combinations 120 may be predetermined, or the set of known feature combinations 120 may be identified by the design engine 102 from listings of one or more electronic marketplaces, online articles, blogs, reviews, social media post, or any suitable form of electronic content. In some embodiments, the A-typicality score may quantify a degree of difference (or uniqueness) of a particular feature combination given known feature combinations for items in the same category or a different category (e.g., "headphones," "electronics," etc.) from the category associated with the particular feature combination (e.g., "wireless headphone"). Accordingly, potential feature combinations that differ from known feature combinations may receive a higher a-typicality score than combinations which are relatively more similar to known feature combinations. In some embodiments, the potential feature combinations may be scored based at least in part on a myriad of factors such as a degree of a-typicality to features provided by items in a same or different item category, how easy the product will be to manufacture, a manufacturing cost for producing the item, a degree of user-friendliness of the item, and the like. Each of these factors will be discussed in more detail below, specifically in connection with FIG. 5.

At 122, a subset of the set of potential feature combinations 116 may be identified based at least in part on the scores provided by the second machine-learning model (or another component of the design engine 501). In some embodiments, the subset may include any suitable number (e.g., one or more, all, etc.) the set of potential feature combinations 116.

Thus, by utilizing the identification process described above with respect to FIG. 1, one or more potential feature combinations may be identified automatically utilizing machine-learning techniques. The functionality provided by the design engine 102 may be utilized to replace some aspects of product design typically performed by a professional design team. This can greatly increase the efficiency of the design process by enabling designers and/or project managers to focus design efforts in other areas of a design process. Additionally, the machine-learning models discussed herein are improved over time (as discussed herein) utilizing reinforced learning techniques. Thus, each of the models discussed herein may improve its accuracy in identifying the data to which it relates (e.g., sentiment phrases, potential feature combinations, etc.).

Figure 2:
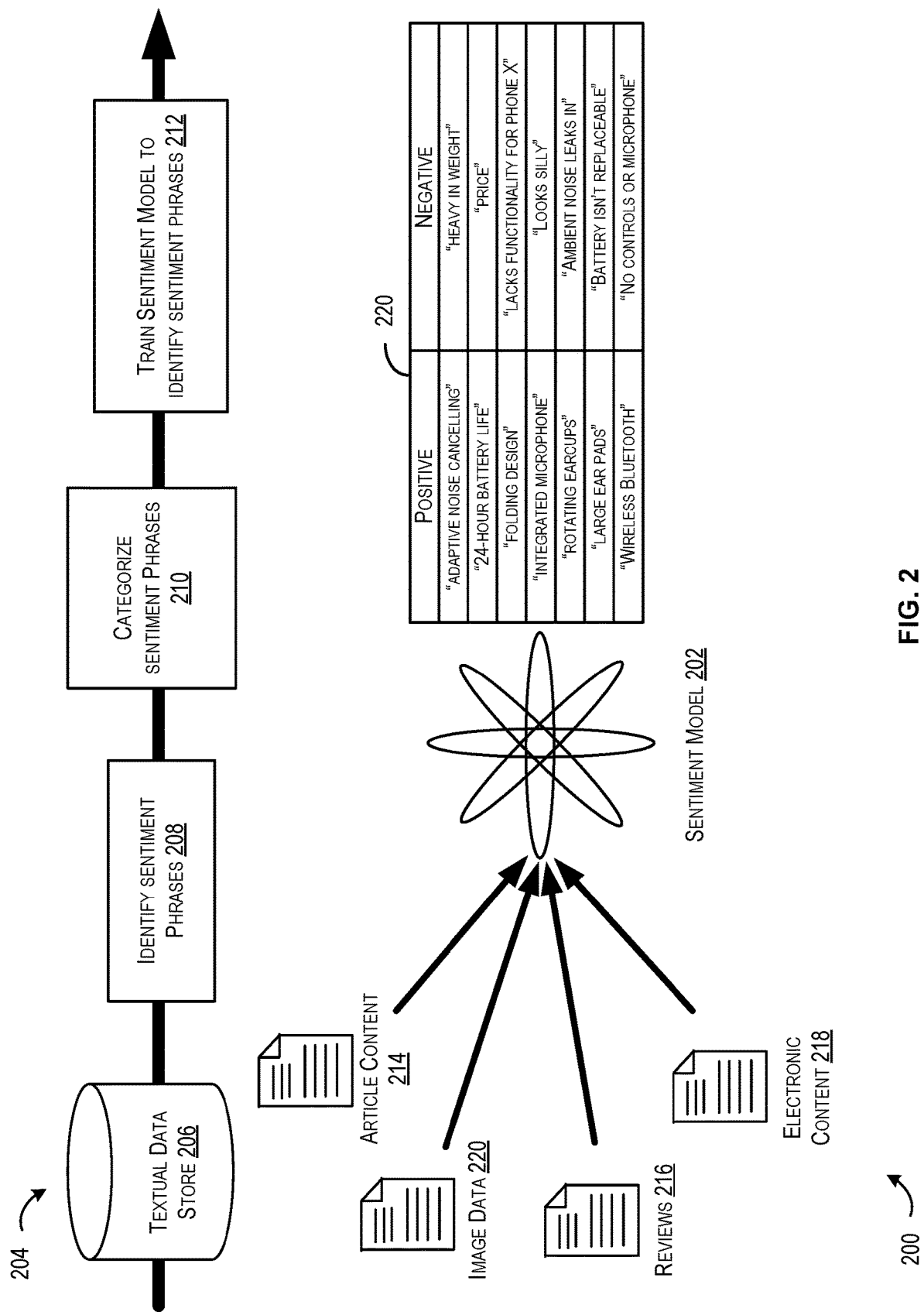
FIG. 2 illustrates a flow for an example sentiment identification process, in accordance with at least one embodiment.

FIG. 2 illustrates a flow for an example sentiment identification process 200 utilizing a sentiment model 202, in accordance with at least one embodiment. The sentiment model 202 may be an example of the first machine-learning model discussed above in connection with FIG. 1. The sentiment identification process 200 may include a training process 204 for training the sentiment model 202 to identify positive and/or negative sentiment phrases from text. As a non-limiting example, the training process may include retrieving textual data from a content data store 206. The content data store 206 may be maintained by the design engine 102 of FIG. 1 or by any suitable software or hardware component. In some embodiments, the textual data may be additionally or alternatively obtained or retrieved from one or more suitable sources (e.g., electronic marketplace websites, blogs, social media platforms/posts, articles, or any suitable online content source). Although not depicted, it should be appreciated that the sentiment model 202 may be trained (or another sentiment model may be trained) utilizing image data (e.g., images, video content, etc.) to identify positive sentiments from images.

As part of the training process 204, sentiment phrases 208 may be identified from the textual data obtained from the content data store 206. In some examples, these sentiment phrases may be identified. The sentiment phrases may be categorized at 210. By way of example, an administrator may prepare a training set that includes a set of textual data, identifies sentiment phrases within the textual data, and further identifies categories associated with the sentiment phrases (e.g., positive, negative, neutral, etc.). Once the training data has been prepared, the training data may be provided to the sentiment model 202 at 212. Utilizing the training data, the sentiment model 202 may utilize any suitable machine-learning techniques, natural language processing techniques, and/or recurrent or non-recurrent neural network techniques to generate a set of rules with which sentiment phrases and a corresponding sentiment polarity/category (e.g., positive, negative, neutral) may be identified. The sentiment model 202 or another sentiment model may also be trained on image data in a similar manner. By way of example, the administrator may prepare a training set that includes a set of image data for which sentiments have been identified and categorized. Once the training data has been prepared, the sentiment model 202 (or another sentiment model) may utilize any image processing techniques to generate a set of rules with which sentiments and/or sentiment polarity (e.g., positive, negative, neutral) may be identified.

Once the sentiment model 202 has been trained utilizing historical data (e.g., the training data described above), the sentiment model 202 may be provided input for sentiment analysis and identification. By way of example, any suitable textual data such as article content 214, reviews 216, and/or electronic content 218 (e.g., blogs, social media posts, etc.) may be provided to the sentiment model 202 as input. In embodiments in which the sentiment model 202 is trained to analyze image data, image data 220 may be provided as input. In other embodiment a separate sentiment model may be utilized to analyze the image data.

Utilizing the rules identified during training, the sentiment model 202 may identify one or more positive and/or negative sentiments (e.g., sentiment phrases and/or images). In some embodiments, the sentiment model 202 may be configured to rank the set of positive sentiments (and separately the set of negative sentiments) according to factors including a frequency the sentiment phrase is expressed among a plurality of textual data providers (and/or a frequency the sentiment is expressed via an image from a plurality of image data providers). In some embodiments, the sentiment model 202 may additionally or alternatively be configured to score a sentiment phrase (referred to herein as a "sentiment score") based at least in part on particular words or subphrases contained in the sentiment phrase. As a simplistic example, a positive sentiment phrase containing the word "love" may be scored higher than a sentiment phrase containing the word "like." If images are utilized, an image containing a person laughing may be scored higher than an image in which a person is smiling or frowning. In some examples, a higher sentiment score may indicate a frequency at which the sentiment (e.g., phrase or similar image) is expressed across users and/or a degree of sentimentality of the sentiment. The sentiment score may correspond to a positive or negative polarity. For example, the set of positive sentiments may individually receive a positive sentiment score that indicates positive sentimentality while the set of negative sentiments may individually receive a negative sentiment score that indicates negative sentimentality. The sentiment model 202 may rank the set of positive sentiment phrases (and/or images) and/or the set of negative sentiment phrases (and/or images) according to the scored assigned. It should be appreciated that, in some embodiments, the sentiment model 202 may identify the positive and negative sentiment phrases (and/or images) but the scoring and ranking could be performed by another component (e.g., a component of the design engine 102 of FIG. 1).

In some embodiments, the sentiment model 202 may provide output 222 which may include one or more of the identified positive sentiments (phrases and/or images) and one or more of the negative sentiments (phrases and/or images). If the sentiment model 202 assigned sentiment scores to the identified sentiments, output 222 may be ranked according to those sentiment scores. In some embodiments the sentiment scores may be included in output 222. In some embodiments, set of positive sentiment phrases and negative sentiment phrases may be provided in output 222 in any suitable form, including, but not limited to one or more mappings. By way of example output 222 may include a single mapping in which positive and negative sentiment phrases are identified as being positive or negative. As another example, the output 222 may include two lists, where one list identifies the positive sentiment phrases (and potentially identifies ranks and/or positive sentiment scores), and the other list identifies the negative sentiment phrases (and potentially identifies ranks and/or negative sentiment scores). A similar mapping or the same mapping depicted in FIG. 2 may be utilized to identify a list of positive or negative sentiments expressed in input image data.

Figure 3:
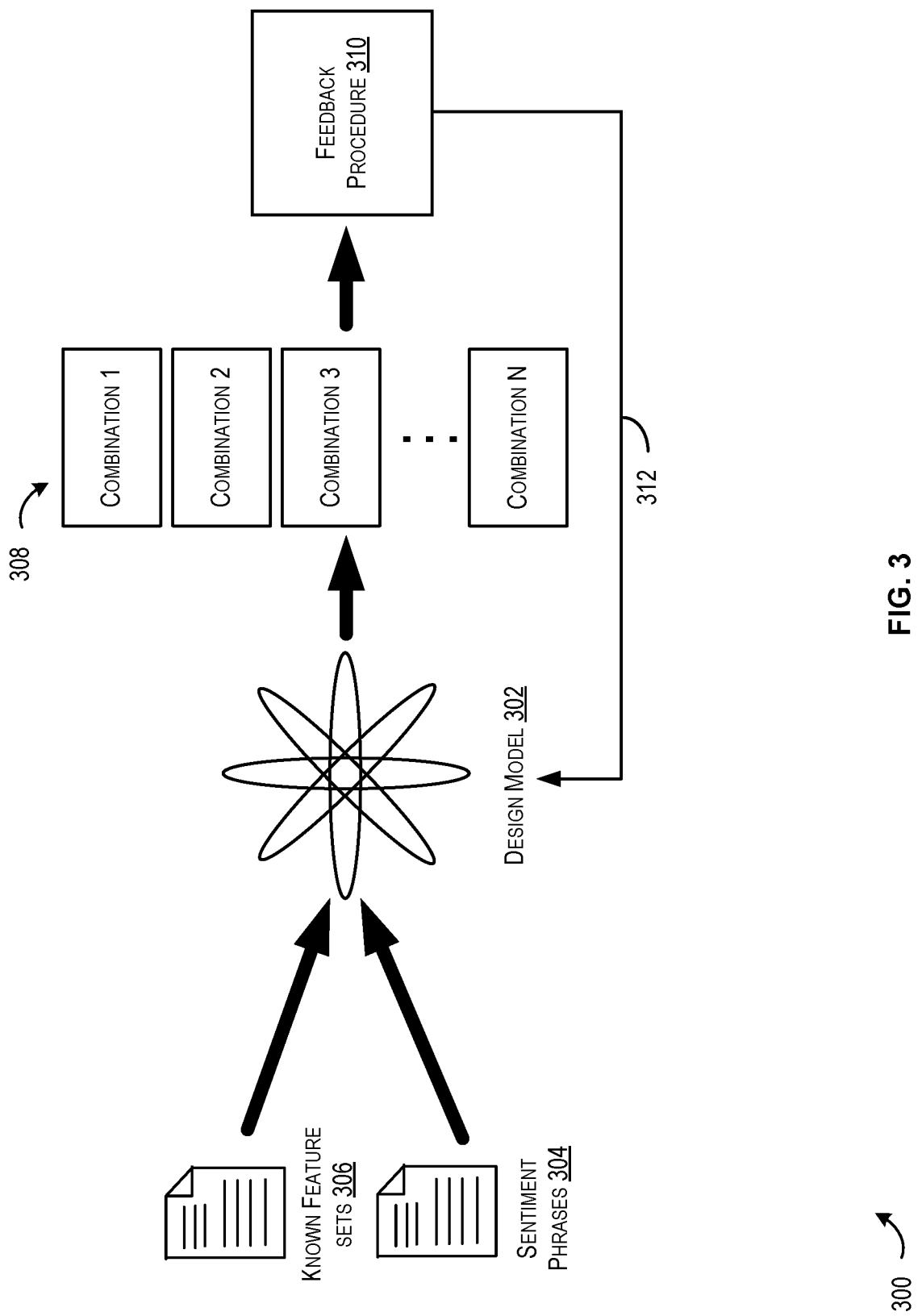
FIG. 3 illustrates a flow for an example feature combination identification process which utilizes a design model, in accordance with at least one embodiment.

FIG. 3 illustrates a flow for an example feature combination identification process 300 which utilizes a design model 302, in accordance with at least one embodiment. The design model 302 may be an example of the second machine-learning model discussed above in connection with FIG. 1. The design model 302 may be configured to utilize any suitable exploration/exploitation algorithm to identify a set of potential feature combinations. In some embodiments, the design model 302 may be configured to accept as input sentiment phrases 304. Sentiment phrases 304 may be obtained by the design model 302 from a data store and/or directly from the sentiment model 202 of FIG. 2. The sentiment phrases 304 may correspond to output 222 of FIG. 2.

In some embodiments, the design model 302 may accept known feature sets 306 as input. The known feature sets 306 may include one or more features associated with the one or more known items (e.g., previously manufactured items offered via an electronic marketplace). These known feature sets 306 may relate to items of a category (e.g., wireless headphones) associated with the sets of potential feature combinations and/or the known feature sets 306 may relate to items of a broader/narrower/different category (e.g., "headphones," "electronics," "speakers," etc.). These known features sets 306 may be predetermined and/or the known feature sets 306 may be identified based at least in part on a particular item and/or item category/subcategory corresponding to the sentiment phrases 304. That is, if the sentiment phrases 304 corresponds to a particular item and/or item category/subcategory (e.g., "wireless headphones X," "headphones, "wireless headphones," etc.), the known feature sets 306 may pertain to known feature combinations corresponding to other items that are similar to the particular item. In this example, known feature sets 306 may correspond to other particular wireless headphone X, other headphones generally, and/or other wireless headphones. In some embodiments, the known feature sets 306 may be identified by analyzing (e.g., by the design engine 102) item feature information associated with item listings of one or more electronic marketplaces. In some embodiments, the design engine 102 may generate the known feature sets 306 through this analysis.

In some embodiments, the design engine 102 may be configured to generate and/or modify known feature sets 306 utilizing image data. By way of example, the design engine 102 may be configured to utilize any suitable image processing techniques to identify items and/or attributes of an item from an image. By way of example, the design engine 102 may identify that a particular shirt is provided with a particular type of collar based on analyzing an image of a person wearing the particular shirt. Thus, in some embodiments, attributes that might not be stored with the item feature information (e.g., catalog attributes for an item offered in an electronic marketplace) can be determined from image data (e.g., images provided by social media posts or any suitable image). Thus, image data may be utilized as another source of data from which item features may be ascertained.

The design model 302 may utilize any exploration/exploitation algorithm (e.g., a multi-armed bandit algorithm) and the sentiment phrases 304 to identify a set of potential feature combinations and provide this set as output 308. By way of example, the output 308 may include a set of combinations (e.g., combinations 1, 2, and 3) that individually include a different combination of potential features. Output 308 may be generated based at least in part on sentiment scores of the sentiment phrases 304 which indicate a degree of sentimentality (and a sentiment polarity) and/or the frequency as which a sentiment phrase has been expressed (as discussed above in relation to FIG. 2).

The design model 302 may be further configured to utilize the known feature sets 306 to generate scores for each combination of the output 308. In some embodiments, the score may be an A-typicality score that quantifies a degree of A-typicality with respect to a set of known feature combinations 120. Accordingly, potential feature combinations that differ from known feature combinations may receive a higher (or lower depending on the particular algorithm) score than combinations which are relatively more similar to known feature combinations. The design model 302 may be configured to rank the potential feature combinations according to the score. In some embodiments, the score may additionally or alternatively quantify a degree of manufacturing difficulty, a cost of manufacturing the item, a degree of user friendliness, estimated sales for the item, or any suitable factor which may generally relate to the desirability and/or undesirability to manufacture and/or offer the item for consumption.

A feedback procedure 310 may be executed utilizing the output 308. In some embodiments, the feedback procedure 310 may include providing any suitable portion of the output 308 to one or more users and/or one or more remote systems (e.g., design systems, manufacturing systems, crowdsource data collection systems, etc.). By way of example, the combinations 1-N to a crowdsource system to illicit feedback as to the desirability and/or practicality of each combination. A user (e.g., experienced designers, consumers, or the like) of the crowdsource system may provide a score, ranking, or other suitable user input (e.g., comments) which may indicate a degree to which a particular combination is desirable and/or practical to manufacture. In some examples, the output 308 may be provided directly to a set of users (e.g., predetermined designers associated with a given project, users who have purchased similar items from an electronic marketplace, etc.) to illicit feedback as to the desirability and/or practicality of the feature combination. It is contemplated that the feedback obtained through execution of the feedback procedure 310 may include any suitable electronic content. For example, such electronic content may include sales data associated with an item (e.g., a previously existing item and/or an item that was subsequently manufactured according to a feature combination of output 308), the item including at least some of the features of a combination included in output 308. The feedback may additionally or alternatively include navigation data of an electronic marketplace indicating a number of times users of the electronic marketplace viewed an item having at least some of the features of a combination included in output 308. The feedback may additionally or alternatively include textual data (e.g., one or more reviews, articles, blogs, social media posts, etc.) obtained from an electronic marketplace and/or a third-party website associated with an item that includes at least some of the features a feature combination of the output 308.

The feedback obtained through execution of the feedback procedure 310 may be provided to the design model 302 at 312 in order to modify rules associated with the exploration/exploitation algorithm to better identify subsequent potential feature combinations. That is, the design model 302 may use negative feedback and/or positive feedback to modify the manner in which it identifies potential feature combinations. Subsequent potential feature combinations generated by the design model 302 may include a score that is calculated based on an A-typicality determination as discussed above and/or the score may be based at least in part on the feedback provided by at 312. Thus, the design model 302 may be improved over time utilizing the feedback provided.

Figure 4:
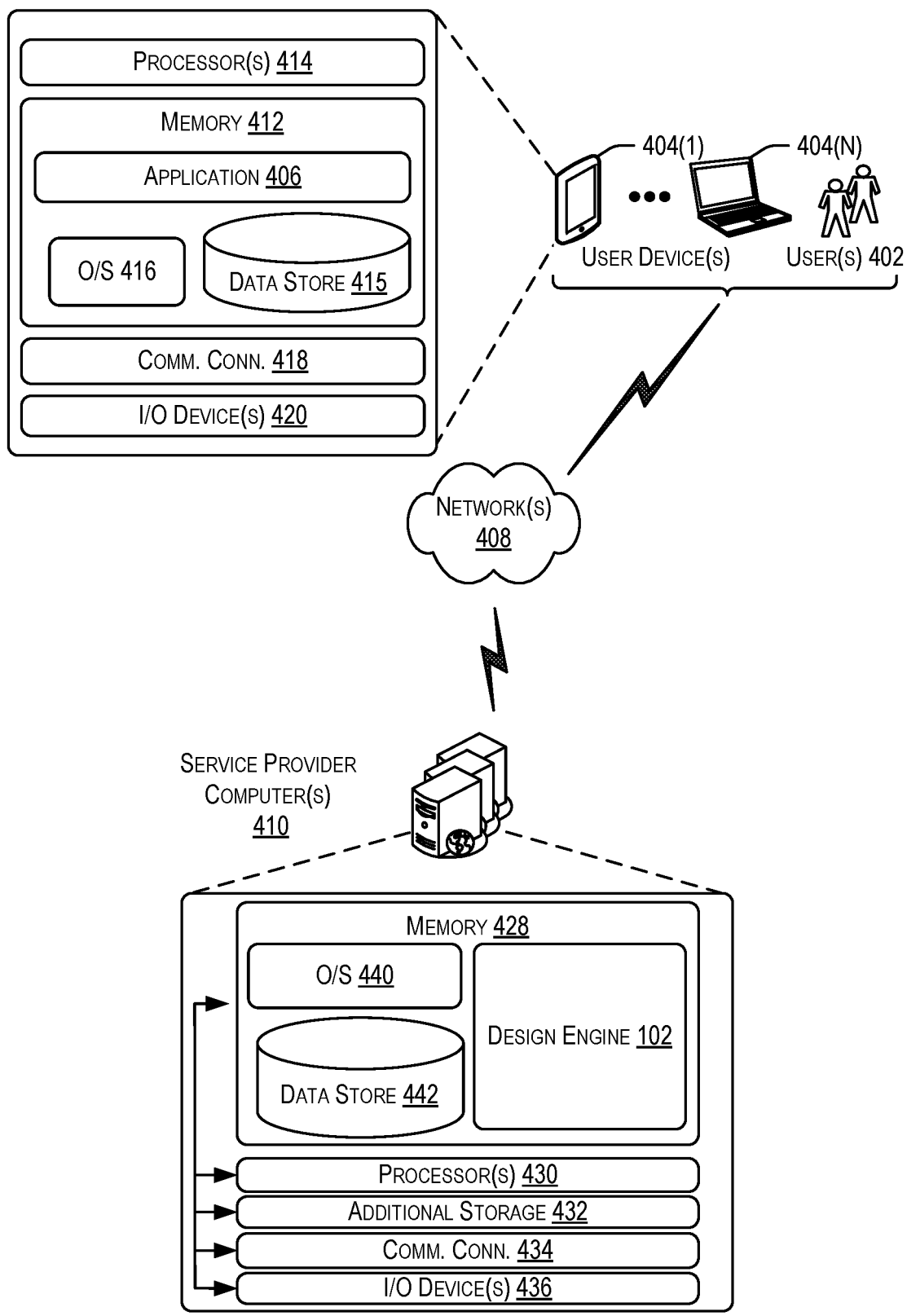
FIG. 4 illustrates components of a design system according to a particular embodiment.

FIG. 4 illustrates components of a design system 400 according to a particular embodiment. In design system 400, one or more user(s) 402 may utilize a user device (e.g., a user device of a collection of user device(s) 404 to navigate to a network page provided by the service provider computer (s) 410. For example, the user may access a user interface accessible through an application 406 running on the user device(s) 404 via one or more network(s) 408. In some aspects, the application 406 operating on the user device(s) 404 may be hosted, managed, and/or provided by a computing resources service or service provider, such as by utilizing one or more service provider computer(s) 410.

In some examples, the network(s) 408 may include any one or a combination of many different types of networks, such as cable networks, the Internet, wireless networks, cellular networks, and other private and/or public networks. While the illustrated example represents the user(s) 402 accessing application functionality over the network(s) 408, the described techniques may equally apply in instances where the user(s) 402 interact with the service provider computer(s) 410 via the one or more user device(s) 404 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the design engine 102, discussed further below in more detail, may operate in whole or in part on the user device(s) 404. Thus, in some embodiments, the user(s) 402 may access the functionality of the design engine 102 directly through the user device(s) 404 and/or the service provider computer(s) 410 via user interfaces provided by the design engine 102.

In some embodiments, the application 406 may allow the user(s) 402 to interact with the service provider computer(s) 410 so as to provide the various functionality described above with respect to the design engine 102. For example, a user may utilize the application 406 to input item details such as a category, sub-category, item description, item identifier, or any suitable information related to an item, an item category, and/or an item subcategory. In at least one example, the application 406 may provide a network page and/or user interfaces with which the user(s) 402 may select from presented item details, search for an item, input item details (e.g., item and/or item category or subcategory), or otherwise provide any suitable combination of item information. The application 406 may be configured to transmit (electronically convey) the user's input(s) to the design engine 102, operating at the user device(s) 402 and/or the service provider computer(s) 410. The application 406 may further be configured to receive, process, and/or display any suitable data received from the service provider computer(s) 410 (e.g., recommended potential feature combinations).

The service provider computer(s) 410, perhaps arranged in a cluster of servers or as a server farm, may host the application 406 operating on the user device(s) 404 and/or cloud-based software services. Other server architectures may also be used to host the application 406 and/or cloud-based software services. The application 406 operating on the user device(s) 404 may be capable of handling requests from the user(s) 402 and serving, in response, various user interfaces that can be rendered at the user device(s) 404. The application 406 operating on the user device(s) 404 can present any suitable type of website that supports user interaction, including search engine sites, item detail pages, and the like. The described techniques can similarly be implemented outside of the application 406, such as with other applications running on the user device(s) 404.

The user device(s) 404 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 404 may be in communication with the service provider computer(s) 410 via the network(s) 408, or via other network connections.

In one illustrative configuration, the user device(s) 404 may include at least one memory 412 and one or more processing units (or processor(s)) 414. The processor(s) 414 may be implemented as appropriate in hardware, computer-executable instructions, firmware, or combinations thereof. Computer-executable instruction or firmware implementations of the processor(s) 414 may include computer-executable or machine-executable instructions written in any suitable programming language to perform the various functions described.

The memory 412 may store program instructions that are loadable and executable on the processor(s) 414, as well as data generated during the execution of these programs. Depending on the configuration and type of user computing device, the memory 412 may be volatile (such as random access memory (RAM)) and/or non-volatile (such as read-only memory (ROM), flash memory, etc.). The user device(s) 404 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 412 may include multiple different types of memory, such as static random access memory (SRAM), dynamic random access memory (DRAM), or ROM.

Turning to the contents of the memory 412 in more detail, the memory 412 may include an operating system 416, one or more data stores 415, and one or more application programs, modules, or services for implementing the features of the design engine 102 disclosed herein, provided via the application 406 (e.g., a browser application, a design generation application, etc.). The application 406 may be configured to receive, store, and/or display a network page or other interface for interacting with the service provider computer(s) 410. Additionally, the memory 412 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 404 may also contain communications connection(s) 418 that allow the user device(s) 404 to communicate with a stored database, another computing device or server (e.g., the service provider computer(s) 410), user terminals and/or other devices on the network(s) 408. The user device(s) 404 may also include I/O device(s) 420, such as a keyboard, a mouse, a pen, a voice input device, a touch input device, a display, speakers, a printer, etc.

In some aspects, the service provider computer(s) 410 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 410 are executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment. In some examples, the service provider computer(s) 410 may be in communication with the user device(s) 404 and/or other service providers via the network(s) 408 or via other network connections. The service provider computer(s) 410 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 410 may include at least one memory 428 and one or more processing units (or processor(s)) 430. The processor(s) 430 may be implemented as appropriate in hardware, computer-executable instructions, firmware, or combinations thereof. Computer-executable instruction or firmware implementations of the processor(s) 430 may include computer-executable or machine-executable instructions written in any suitable programming language to perform the various functions described.

The memory 428 may store program instructions that are loadable and executable on the processor(s) 430, as well as data generated during the execution of these programs. Depending on the configuration and type of service provider computer(s) 410, the memory 428 may be volatile (such as RAM) and/or non-volatile (such as ROM, flash memory, etc.). The service provider computer(s) 410 or servers may also include additional storage 432, which may include removable storage and/or non-removable storage. The additional storage 432 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 428 may include multiple different types of memory, such as SRAM, DRAM, or ROM.

The memory 428, the additional storage 432, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 428 and the additional storage 432 are all examples of computer storage media. Additional types of computer storage media that may be present in the service provider computer(s) 410 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 410. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 410 may also contain communications connection(s) 434 that allow the service provider computer(s) 410 to communicate with a stored database, another computing device or server, user terminals and/or other devices on the network(s) 408.

The service provider computer(s) 410 may also include I/O device(s) 436, such as a keyboard, a mouse, a pen, a voice input device, a touch input device, a display, speakers, a printer, etc.

Turning to the contents of the memory 428 in more detail, the memory 428 may include an operating system 440, one or more data stores 442, and/or one or more application programs, modules, or services for implementing the features disclosed herein, such as the features provided by the design engine 102.

Figure 5:
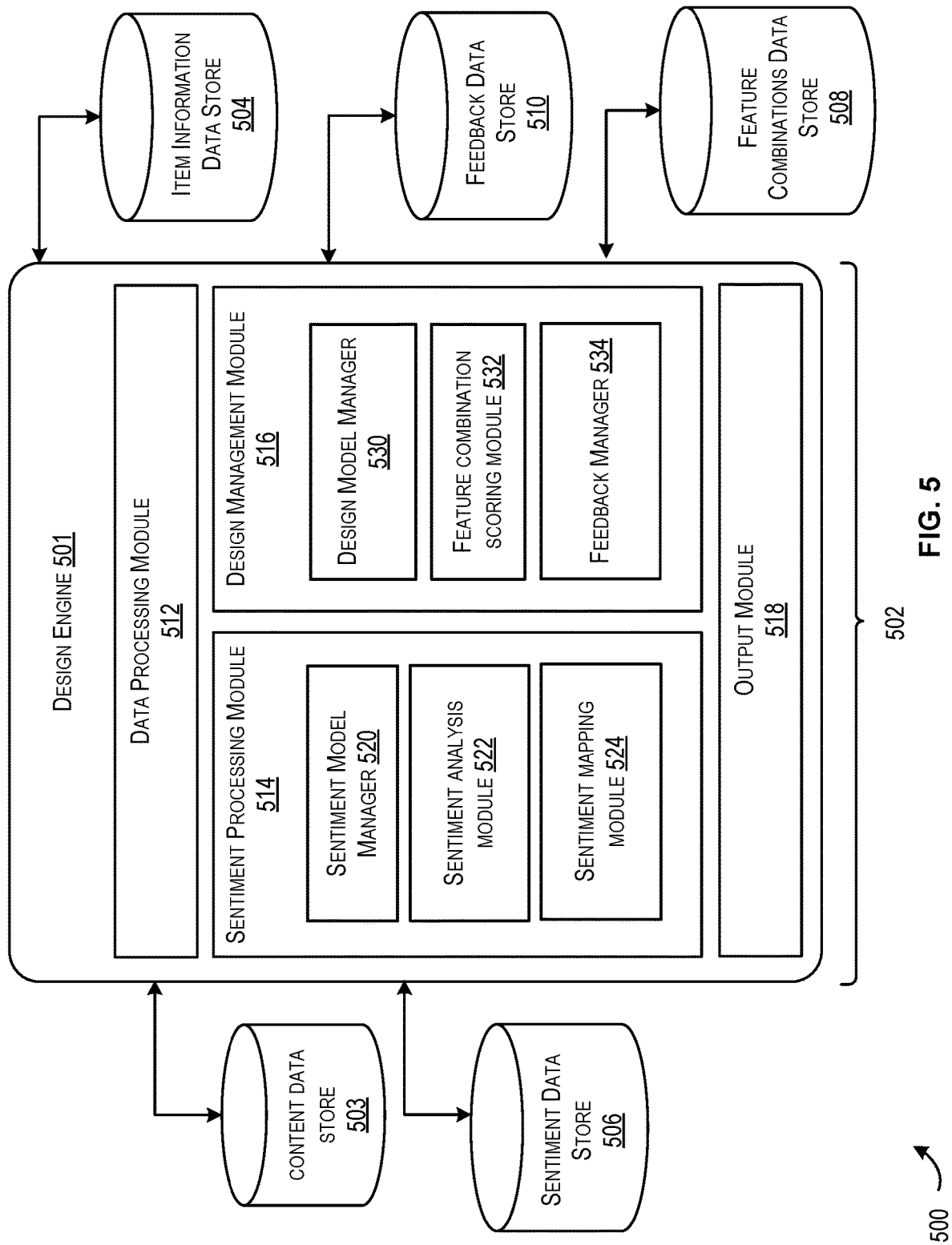
FIG. 5 is a schematic diagram of an example computer architecture for the design engine, including a plurality of modules that may perform functions in accordance with at least one embodiment.

FIG. 5 is a schematic diagram of an example computer architecture 500 for the design engine 501 of FIG. 1, including a plurality of modules 502 that may perform functions in accordance with at least one embodiment. The design engine 501 may be an example of the design engine 102 of FIG. 1. The modules 502 may be software modules, hardware modules, or a combination thereof. If the modules 502 are software modules, the modules 502 can be embodied on a computer readable medium and processed by a processor in any of the computer systems described herein. It should be noted that any module or data store described herein, may be, in some embodiments, be a service responsible for managing data of the type required to make corresponding calculations. The modules 502 may be exist as part of the design engine 501 operating on the service provider computer(s) 410 of FIG. 4, or the modules may exist as separate modules or services external to the service provider computer(s) 410 (e.g., as part of the application 406 of FIG. 4 operating on the user device(s) 404 of FIG. 4).

In the embodiment shown in the FIG. 5, a content data store 503, an item information data store 504 are shown, a sentiment data store 506, a feature combinations data store 508, and a feedback data store 510 are shown, although data can be maintained, derived, or otherwise accessed from various data stores, either remote or local to the design engine 501, to achieve the functions described herein. In at least one embodiment, the data stores described herein may be physically located on the user device(s) 404 or alternatively, any suitable combination of the data stores may be operated as part of the service provider computer(s) 410, for example, as part of an design engine 501. The design engine 501, as shown in FIG. 5, includes various modules such as a data processing module 512, a sentiment processing module 514, a design management module 516, and an output module 518. Some functions of the modules 502 are described below. However, for the benefit of the reader, a brief, non-limiting description of each of the modules is provided in the following paragraphs. In accordance with at least one embodiment, a process is identifying potential feature combinations for a new item.

In at least one embodiment, the design engine 501 includes the data processing module 512. Generally, the data processing module 512 may be utilized to receive any suitable information with respect to any example provided herein. The data processing module 512 may include any suitable number of application programming interfaces with which the functionality of the design engine 501 may be invoked.

In some embodiments, the data processing module 512 may be configured to receive content data (e.g., textual data, reviews, articles, blog content, social media posts, etc.), sentiment data (e.g., information indicating a positive and/or negative sentiment associated with a word or phrase), item information data (e.g., information that identifies particular attributes and/or features of an item, a feature set associated with an item, etc.), sentiment data, and/or feedback data associated with one or more potential feature combinations identified by the design engine 501 (or a component of the design engine 501). The data processing module 512 may be configured to store the content data received within the content data store 503. Similarly, the item information and the feedback data may be stored by the data processing module 512 within the item information data store 504 and the feedback data store 510 respectively. The data processing module 512 may further be configured to receive user input provided via one or more user interfaces managed by the design engine 501 (e.g., by the output module 518). The data processing module 512 may be configured to provide any suitable information received to any suitable combination of the remaining modules 502.

In some embodiments, the data processing module 512 may receive user input via a user interface provided by the output module 518. The user input may indicate a particular item and/or item category/subcategory for which a set of potential feature combinations is to be identified. This user input may provide and/or identify particular data sets with which sentiments and/or feature combinations are to be identified. In some examples, the data processing module 512 may receive input (e.g., from an administrator, from another system) that includes sentiment data (e.g., text data and/or image data) to be utilized for training of a sentiment model as discussed herein. In still further examples, the data processing module 512 may receive input (e.g., from an administrator) that includes item-related information corresponding to one or more items offered within one or more electronic marketplaces. The item-related information may include, for example, a number of feature sets corresponding to an item of the one or more items. In some examples, the item-related information may further include reviews, textual data, articles, blog content, social media posts, image data, or any suitable electronic content related to an item and/or item category/subcategory. In some embodiments, the data processing module 512 may receive feedback data that may include one or more scores associated with one or more previously provided potential feature combinations. The data processing module may additionally be configured to receive feedback data that may include navigational data of an electronic marketplace, sales data, or any suitable feedback discussed herein.

The sentiment processing module 514 may include a sentiment model manager 520, a sentiment analysis module 522, and a sentiment mapping module 524. The functionality of the sentiment model manager 520 may be invoked by the data processing module 512. By way of example, upon receiving input indicating that features combinations for a particular item and/or item category/subcategory are to be identified. The input may include an indication of particular sentiment data to be utilized (e.g., for training purposes). The particular sentiment data indicated may include a predetermined training set that contains a set of sentiment phrases (and/or images) for which a positive or negative sentiment polarity has been determined. The data processing module 512 may invoke functionality of the sentiment processing module 514 via a function call which may include or otherwise identify sentiment data (e.g., received sentiment data and/or sentiment data stored within the sentiment data store 506).

In some embodiments, the sentiment model manager 520 may be configured to train a sentiment model (e.g., the sentiment model 202 of FIG. 2) to identify words and/or phrases (and/or images) that indicate a positive or negative sentiment. A positive or negative sentiment may be indicated using a whole number (e.g., 1 for positive, 2 for negative), and/or a positive/negative sentiment may be indicated by a value that indicates a likelihood that the sentiment is positive and or negative (e.g., 0.6 indicates a 60% likelihood that a sentiment is positive, −0.7 indicates a 70% likelihood that a sentiment is negative). The sentiment model manager 520 may obtain training data including the received sentiment data and/or stored sentiment data from the sentiment data store 506. As described above, the sentiment model manager may train a recurrent neural network (or another suitable machine-learning algorithm) based at least in part on the training data in accordance with the training process 204 of FIG. 2.

Once the sentiment model manager 520 has trained a sentiment model (e.g., corresponding to a particular item and/or item category and/or subcategory), the sentiment analysis module 522 may be configured to identify input sentiment data from item-related information contained in the content data store 503. Any suitable combination of data such as reviews, textual data, image data, articles, blog content, social media posts, or any suitable electronic content related to an item and/or item category/subcategory may be identified from the content data store 503 based at least in part on input provided by the data processing module 512. By way of example, the data processing module 512 may provide input that indicates that potential feature combinations are to be determined for "wireless headphones." Accordingly, the sentiment analysis module 522 may retrieve content data from the content data store 503 that corresponds to items related to "wireless headphones." In some embodiments, the sentiment analysis module 522 may retrieve item-related information (e.g., item attributes) associated with items related to "wireless headphones."

The sentiment analysis module 522 may be configured to provide the retrieved content data and/or item-related information to the trained sentiment model (e.g., the sentiment model 202 of FIG. 2) to obtain output. The output may include, as described above, a set of positive sentiment phrases and/or a set of negative sentiment phrases. In some embodiments, positive and/or negative sentiments may be ascertained from image data and included in the output. In some embodiments, the sentiment model and/or the sentiment analysis module 522 may be configured to score the sentiment phrases (or images) to indicate a sentiment polarity (e.g., positive or negative) or a likelihood (e.g., 0.6, −0.4, etc.) that the sentiment is positive or negative.

In some embodiment, the sentiment model and/or the sentiment analysis module 522 may be configured to score the sentiments based at least in part on sentiment polarity (e.g., indicating a positive or negative sentiment) of the identified sentiment phrases (and/or image). The sentiment scores may be indicated using a whole number (e.g., 1 for positive, 2 for negative), and/or the sentiment score may include a value that indicates a likelihood that the sentiment is positive and or negative (e.g., 0.6 indicates a 60% likelihood that a sentiment is positive, −0.7 indicates a 70% likelihood that a sentiment is negative). In some embodiments, the sentiment scores may indicate a degree to which the sentiment is positive or negative. That is, a higher positive sentiment score may indicate a more positive sentiment (e.g., corresponding to a phrase including "love") than a lower positive sentiment score (e.g., corresponding to a phrase including "like"). The sentiment model and/or the sentiment analysis module 522 may be configured to sort the identified sentiment into two sets, one set of positive sentiment phrases and a second set of negative sentiment phrases.

In some embodiments, the sentiment mapping module 524 may be configured to map identified sentiment phrases to particular features of a given item or set of items.

Continuing with the example of identifying feature combinations for "wireless headphones," a feature set associated with "wireless headphones" may be retrieved from the item information data store 504. In some embodiments, the sentiment mapping module 524 may generate the feature set by identifying a superset of the features for all items determined to be related to "wireless headphones." As describe above, some the feature set for "wireless headphones" may include "battery life," "Bluetooth® capabilities," "method for charging the battery," "replaceable battery," "range," "sound quality," "folding design," "sweat resistant," "ear pad size," "ear pad style," "platforms supported," "weight," "price," "noise-cancelling," "durability," "microphone," and the like. In some embodiment, the sentiment analysis module 522 may be configured to identify at least part of the feature set directly from a catalog listing of the item associated with the electronic marketplace, from third-party electronic marketplace listings, from content data (e.g., textual data related to the item or similar items) and/or item information data (e.g., attributes associated with the item or similar items) obtained from a third-party source (e.g., a consumer review), from social media platform, or any suitable electronic content source from which an association between a feature and an item/category of items may be identified.

In some embodiments, the sentiment mapping module 524 may be configured to generate and/or modify a feature set utilizing image data. By way of example, the sentiment mapping module 524 may be configured to utilize any suitable image processing techniques to identify features of an item from image data (e.g., one or more images). By way of example, the sentiment mapping module 524 may identify that a particular shirt is provided with a particular type of collar based on analyzing an image of a person wearing the particular shirt. As another example, the sentiment mapping module 524 may be configured to identify that a particular make and model of vehicle comes in a particular color. Thus, in some embodiments, attributes that might not be stored within the item feature information can be determined from image data (e.g., images provided by social media posts or any suitable image). Thus, image data may be utilized as another source of data from which item features may be ascertained.

In some embodiments, the identified sentiments (e.g., phrases and/or image) may be ranked (e.g., within a set of positive sentiments and a set of negative sentiments) based at least in part on the sentiment score and/or an importance associated to particular features. For example, the feature set obtained from the item information data store (and/or ascertained from image data) may include an importance indication (e.g., a ranking) of the particular features of the set. In other embodiments, the sentiments may be scored and/or ranked according to the feature to which they relate. In some embodiments, the sentiment score may reflect a number of times for which a sentiment is expressed that is related to a given feature. More simplistically, reviews and/or images may indicate that users most often remark on a wireless headphones battery life (or another feature of the feature set). Accordingly, the sentiment mapping module 524 may be configured to rank sentiments related to battery life higher than sentiments related to features that are less often remarked upon. Once a set of positive and/or negative sentiments are identified and scored and/or ranked, the sentiment processing module 514 (or any suitable component thereof) may be configured to provide the positive and/or negative sentiments (e.g., phrases and/or images) along with the indication of their corresponding related feature to the design management module 516 for further processing.

The design management module 516 may include a design model manager 530, a sentiment analysis module 522, and a sentiment mapping module 524. The functionality of the sentiment model manager 520 may be invoked by the sentiment processing module 514 through, for example, a function call that includes a set of positive and/or negative sentiments. In some examples, the design model manager 530 is configured to receive the sentiments identified by the sentiment processing module 514. As a non-limiting example, the design model manager 530 may receive a set of positive sentiment phrases (and/or images) and a set of negative sentiment phrases (and/or images) identified by the sentiment processing module 514.

The design model manager 530 may utilize a design model (e.g., the design model 302 of FIG. 3) which may utilize an exploration/exploitation algorithm (e.g., a multi-armed bandit algorithm) to generate a number of potential feature combinations utilizing the sentiments identified (and potentially the features to which they relate). In some embodiments, the design model may be previously trained on historical information that indicates acceptable and unacceptable combinations of features. As a non-limiting example, the historical information may be include reviews, image data, articles, blogs, sales data, marketing data, and the like that indicates that particular feature combinations which have been found to be desirable (as indicated by sales data, reviews, articles, and the like) in the past and/or particular feature combinations which have been found to be undesirable in the past (as indicated by sales data, reviews, articles, and the like). In some examples, this historical information may be retrieved from the content data store 503, the item information data store 504 or another suitable storage location.

In some embodiments, the design model may factor in the sentiment score and/or ranking and/or feature to which the sentiment relates when determining the set of potential feature combinations. In some examples, the design model may be configured to utilize at least one positive and at least one negative sentiment phrase (and their corresponding features) when determining potential feature combinations. Thus, the design model may be configured to consider both positive and negative sentiments such that feature combinations may include features that were praised (e.g., via positive polarity sentiments), as well as features that were criticized (e.g., via negative polarity sentiments). In some embodiments, the design model manager 530 may determine improved features (e.g., "extended battery life") to be included in a potential feature combination based at least in part on one or more negative sentiments (e.g., "dies within two hours"). Utilizing the techniques described, the design model manager 530 is configured to generate output (e.g., the output 308 of FIG. 3) corresponding to a set of potential feature combinations.

In some embodiments, the feature combination scoring module 532 may be configured to generate a score for each combination of the feature combinations generated by the design model manager 530 (or more specifically, the design model managed by the design model manager 530). In some examples the design model manager 530, the design model and/or the feature combination scoring module 532 (or another component of the design engine 501) may be configured to score each combination of the set of potential feature combinations with respect to a set of known feature combinations. The set of known feature combinations may be predetermined, or the set of known feature combinations may be identified by the feature combination scoring module 532 from item information contained in the item information data store 504 (e.g., identifying known features sets and/or attributes associated with one or more items) and/or from content data (e.g., listings of one or more electronic marketplaces, online articles, blogs, reviews, social media posts, image data, or any suitable form of electronic content) related to one or more items. In some embodiments, the feature combination scoring module 532 may generate higher scores for potential feature combinations that differ from known feature combinations more than other combinations which are relatively more similar to these known feature combinations.

In some embodiments, the design model manager 530, the design model and/or the feature combination scoring module 532 may be configured to generate and/or modify known feature sets utilizing image data. By way of example, the feature combination scoring module 532 may be configured to utilize any suitable image processing techniques to identify items and/or attributes of an item from image data (e.g., one or more images). By way of example, the feature combination scoring module 532 may identify that a particular shirt is provided with a particular type of collar based on analyzing an image of a person wearing the particular shirt. As another example, the feature combination scoring module 532 may be configured to identify that a particular make and model of vehicle comes in a particular color. Thus, in some embodiments, attributes that might not be stored within the item feature information (e.g., catalog attributes for an item offered in an electronic marketplace) can be determined from image data (e.g., images provided by social media posts or any suitable image). Thus, image data may be utilized as another source of data from which item features and/or known feature combinations may be ascertained.

In some embodiments, the score generated by the feature combination scoring module 532 may additionally, or alternatively, quantify a desirability/undesirability of producing an item with the potential feature combination based on a myriad of factors. By way of example, the score may be determined based on an ease of manufacturing the item (e.g., determinable through manufacturing schedules, contracts, etc. for determining overall manufacturing times and/or throughput), a cost associated with manufacturing the item (e.g., based on cost sheets describing costs for individual components needed to produce an item with the potential feature combination), a degree of user friendliness (e.g., as determined from user ratings ascertained from content data associated with the item), and the like.

According to some embodiments, the output module 518 may be configured to provide one or more user interfaces with which item information, content data, sentiment data, and/or feedback data may be obtained. In some embodiments, the one or more interfaces may be configured to enable a user to select and/or specify a particular item and/or item category and/or item subcategory for which potential feature combinations are to be generated. In some embodiments, the output module 518 may be configured to identify a feature combination recommendation based at least in part on a set of potential feature combinations identified by the design management module. A feature recommendation may include one or more of the set of potential feature combinations. In some embodiments, the output module 518 may be configured to select one or more features combinations from the set of potential feature combinations based at least in part on the A-typicality scores assigned by the feature combination scoring module 532. The output module 518 may provide the feature recommendation to any suitable number of users (e.g., project managers, professional designers) and/or systems (e.g., a manufacturing system, a design system, a crowdsource collection system, etc.) based at least in part A-typicality scores.

In some embodiments, feedback data corresponding to the feature recommendation may be received (e.g., by the data processing module 512) and provided to the feedback manager 534. By way of example, the feedback data may include any suitable electronic content such as sales data associated with an item (e.g., a previously existing item and/or an item that was subsequently manufactured according to recommended feature combination), the item including at least some of the features of a recommended feature combination. The feedback may additionally or alternatively include navigation data of an electronic marketplace indicating a number of times users of the electronic marketplace viewed an item having at least some of the features of a recommended feature combinations. The feedback may additionally or alternatively include textual data (e.g., one or more reviews, articles, blogs, social media posts, etc.) obtained from an electronic marketplace and/or a third-party website associated with an item that includes at least some of the features of a recommended feature combination.

The feedback manager 534 may be configured to modify the rules utilized by the design model to enable the design model to better identify subsequent potential feature combinations. Thus, the feedback manager 534 may use the feedback data (e.g., negative feedback and/or positive feedback corresponding to particular feature combinations or subsets of feature combinations) to modify the manner in which the design model identifies potential feature combinations. The feedback manager 534 may further be configured to store the feedback data in the feedback data store 510. Subsequent potential feature combinations generated by the design model manager (e.g., utilizing the updated design model) may include a score that is calculated based on an A-typicality determination as discussed above and/or the score may be based at least in part on the feedback data. Thus, the design model may be improved over time utilizing the feedback provided.

Figure 6:
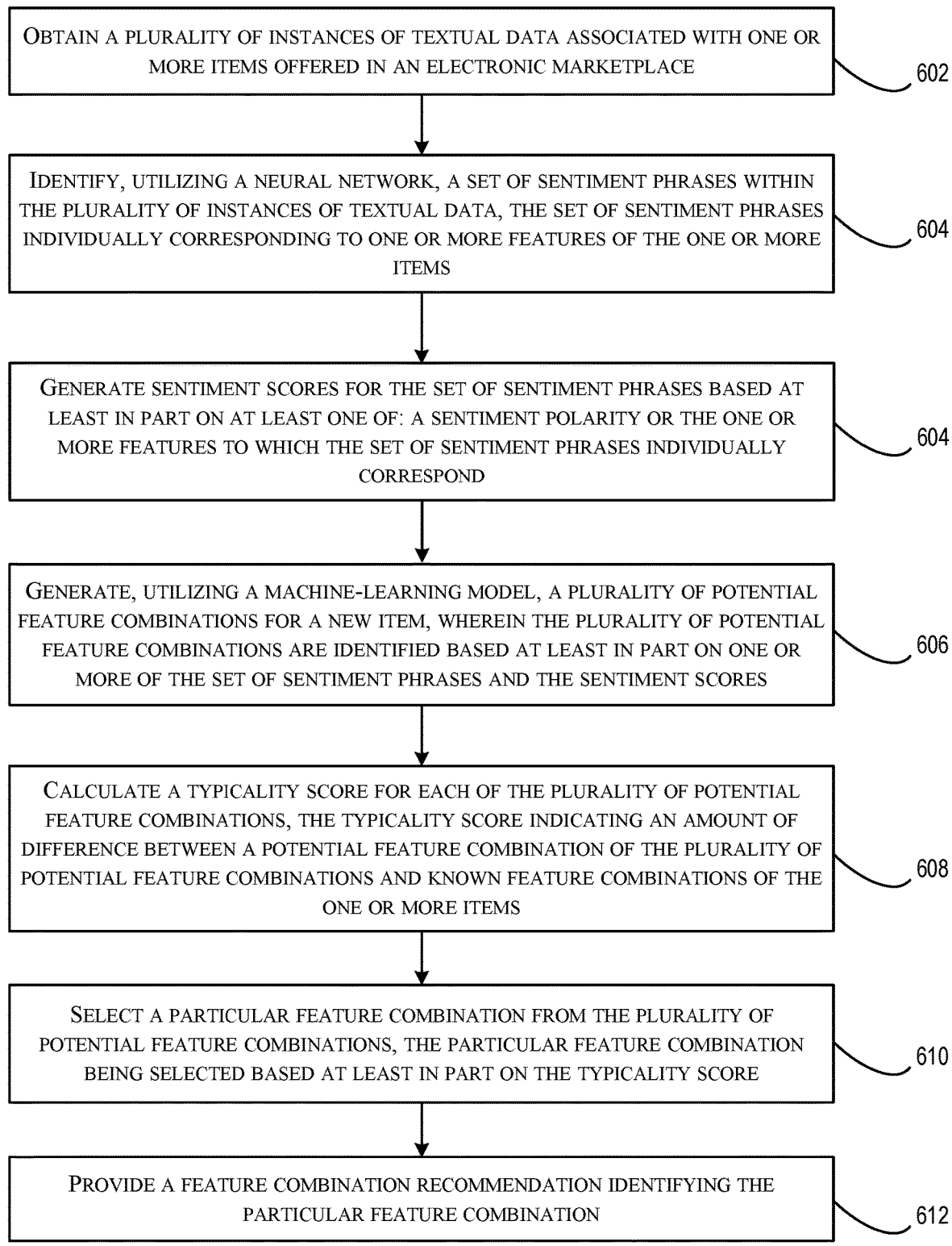
FIG. 6 is a flowchart illustrating an example method for providing a feature combination recommendation utilizing a design engine, in accordance with at least one embodiment.

FIG. 6 is a flowchart illustrating an example method for providing a feature combination recommendation utilizing a design engine 501 of FIG. 5, in accordance with at least one embodiment. A computer-readable medium may store computer-executable instructions that, when executed by at least one processor, cause at least one computer to perform instructions comprising the operations of the method 600. It should be appreciated that the operations of the method 600 may be performed in any suitable, not necessarily the order depicted in FIG. 6. Further, the method 600 may include additional, or fewer operations than those depicted in FIG. 6. The operations of method 600 may be performed by any suitable combination of the modules 502 of the design engine 501 of FIG. 5 which may operate in whole or in part on a user device (e.g., one or more of the user device(s) 404 of FIG. 4) and/or the service provider computer(s) 410 of FIG. 4.

The method 600 may begin at 602, where a plurality of instances of textual data (e.g., any suitable combination of content data) associated with one or more items offered in an electronic marketplace may be obtained (e.g., by the sentiment model manager 520 of FIG. 5). The plurality of instances of textual data may be identified from, for example, the content data store 503 of FIG. 5 and/or such data may be identified directly from one or more sources (e.g., online articles, blogs, social media websites, consumer report websites, consumer review websites, technical blogs, etc.).

At 604, a set of sentiment phrases within the plurality of instances of textual data may be identified (e.g., by the sentiment analysis module 522) utilizing a neural network (e.g., the sentiment model 202 of FIG. 2 as trained by the sentiment model manager 520). The set of sentiment phrases may include one or more subsets. For example, a set of positive sentiment phrases and a set of negative sentiments phrases may be included in the set of sentiment phrases identified from the plurality of instances of textual data. In some embodiments, the set of sentiment phrases may individually correspond to one or more features of the one or more items. As described above the sentiment mapping module 524 may be configured to identify the features of one or more items to which each of the sentiment phrases correspond. The sentiment mapping module 524 may utilize one or more features sets stored in the item information data store 504 to determine which features to which sentiment phrases may pertain. The set of sentiment phrases may be assigned a sentiment score (e.g., indicating a sentiment polarity such as positive or negative, indicating a degree to which the sentiment is positive or negative, and/or indicating a likelihood that the sentiment is positive or negative). The sentiment mapping module 524 may rank the set of sentiment phrases according to the sentiment score and/or according to a feature to which an individual sentiment pertains.

At 606, sentiment scores for the set of sentiment phrases may be generated (e.g., by the sentiment mapping module 524 of FIG. 5). In some embodiments, the sentiment scores may be based at least in part on at least one of: a sentiment polarity of a sentiment phrase or the one or more features to which the set of sentiment phrases individually correspond. Any suitable number or type of factors may be utilized to generate the sentiment score. For example, a number of times a plurality of users express a same or similar sentiment phrase can cause the sentiment phrase to be scored higher than other phrases that are not expressed as often. The sentiment score can factor in a degree of sentiment (e.g., "love" versus "like"), and/or the feature to which the sentiment relates (e.g., based on a predetermined feature ranking indicating a ranking of importance for features of a feature set).

At 608, a plurality of potential feature combinations for a new item may be generated (e.g., by the design model manager 530) utilizing a machine-learning model (e.g., the design model 302 of FIG. 3). In some embodiment, the plurality of potential feature combinations are identified based at least in part on one or more of the set of sentiment phrases and the sentiment scores generated at 606.

At 610, a typicality score for each of the plurality of potential feature combinations may be calculated (e.g., by the feature combination scoring module 532 of FIG. 5). In some embodiment, the typicality score indicates an amount of difference (A-typicality) between a potential feature combination of the plurality of potential feature combinations and known feature combinations of the one or more items.

At 612, a particular feature combination may be selected (e.g., by the output module 518) from the plurality of potential feature combinations. In some embodiments, the particular feature combination may be selected based at least in part on the typicality score. For example, the output module 518 may select a highest (or lowest) scored feature combination from the plurality of potential features combinations to provide in a feature recommendation. In some embodiments, more than one feature combination may be selected from the plurality of potential feature combinations for inclusion in the feature recommendation.

At 614, a feature combination recommendation may be provided (e.g., by the output module 518) that includes the particular feature combination identified at 610. The feature recommendation may be provided to any suitable party and/or system as part of a feedback procedure (e.g., the feedback procedure 310 of FIG. 3).

Figure 7:
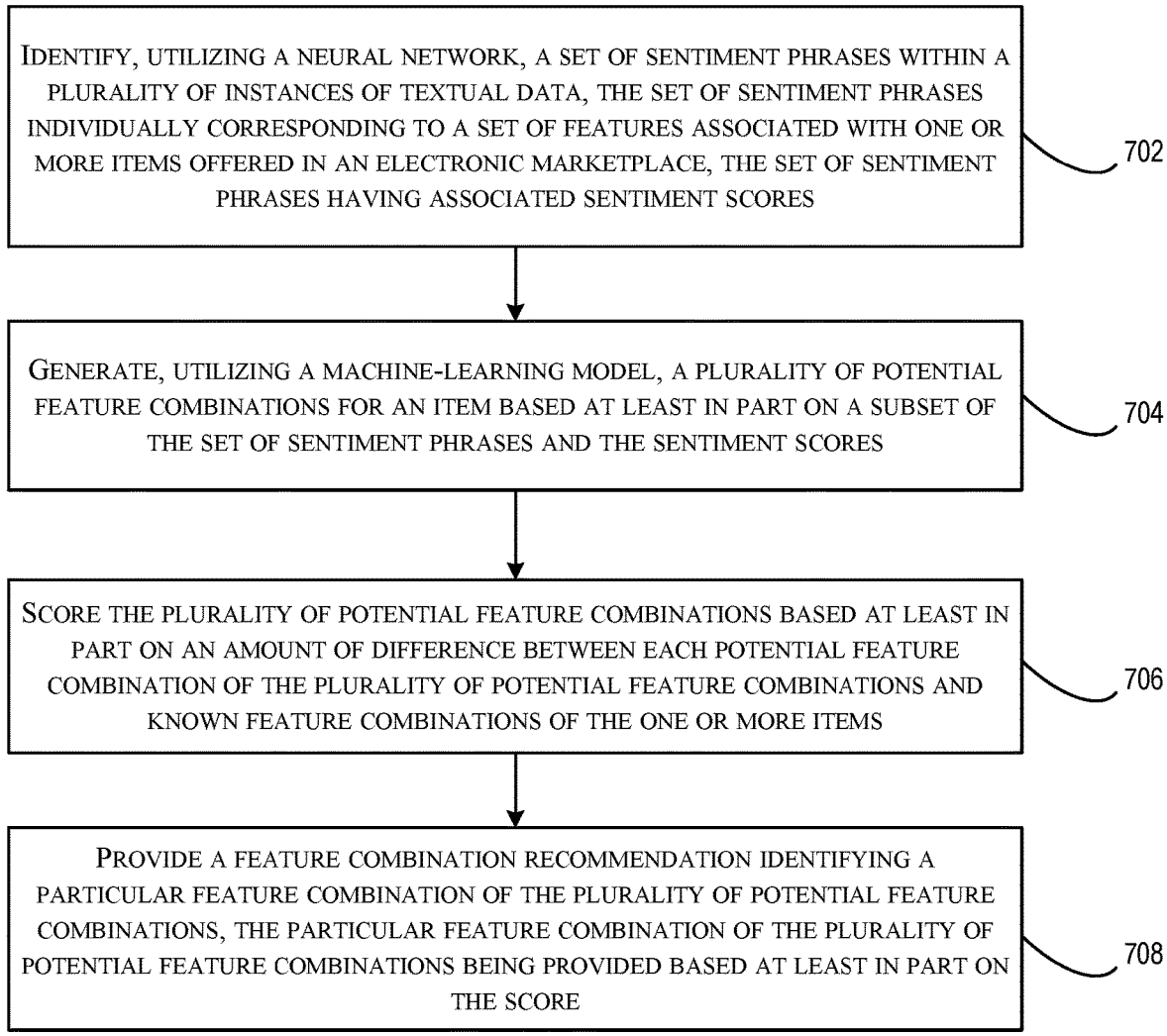
FIG. 7 is another flowchart illustrating another example method for providing a feature combination recommendation utilizing a design engine, in accordance with at least one embodiment.

FIG. 7 is another flowchart illustrating another example method 700 for providing a feature combination recommendation utilizing a design engine 501 of FIG. 5, in accordance with at least one embodiment. A computer-readable medium may store computer-executable instructions that, when executed by at least one processor, cause at least one computer to perform instructions comprising the operations of the method 700. It should be appreciated that the operations of the method 700 may be performed in any suitable, not necessarily the order depicted in FIG. 7. Further, the method 700 may include additional, or fewer operations than those depicted in FIG. 7. The operations of method 700 may be performed by any suitable combination of the modules 502 of the design engine 501 of FIG. 5 which may operate in whole or in part on a user device (e.g., one or more of the user device(s) 404 of FIG. 4) and/or the service provider computer(s) 410 of FIG. 4.

The method 700 may begin at 702, where a set of sentiment phrases within a plurality of instances of textual data, may be identified (e.g., by the sentiment analysis module 522 of FIG. 5). In some embodiments, the set of sentiment phrases individually correspond to a set of features associated with one or more items offered in an electronic marketplace. By way of example, the sentiment phrases of FIG. 2 (e.g., contained in the output 222) may individually be associated with one or more features of a feature set associated with one or more items offered in an electronic marketplace. In some embodiments, the set of sentiment phrases may be associated with sentiment scores indicating a degree of importance (e.g., related to a highly ranked feature) and/or a degree of sentimentality (e.g., positive and/or negative sentiment).

At 704, a plurality of potential feature combinations for an item may be generated by a machine-learning model (e.g., the design model 302) based at least in part on a subset of the set of sentiment phrases. In some embodiments, the machine-learning model may utilize all of the sentiments included in the set of sentiment phrases. The machine-learning model (or the design model manager 530 which may provide input to the machine-learning model) may identify a top number of sentiments from the set of sentiment phrases based at least in part on sentiment scores and/or features to which the sentiment phrases relate. In some embodiments, the machine-model (or the design model manager 530) may identify a number of positive sentiment phrases and a number of negative sentiment phrases from the set of sentiment phrases to be utilized to identify potential feature combinations. As described above the machine-learning model may be configured to utilize an exploration/exploitation algorithm with the features associated with the set of sentiment phrases (and in some cases their corresponding sentiment scores) to identify any suitable number of potential feature combinations.

At 706, the plurality of potential feature combinations may be scored (e.g., by the feature combination scoring module 532 of FIG. 5) based at least in part on an amount of difference between each potential feature combination of the plurality of potential feature combinations and known feature combinations of the one or more items.

At 706, a feature combination recommendation identifying a particular feature combination (or any suitable number of feature combinations) of the plurality of potential feature combinations may be provided (e.g., by the output module 518). In some embodiments, the particular feature combination of the plurality of potential feature combinations may be provided based at least in part on the score identified at 706. The feature combination recommendation may be provided via one or more user interfaces (e.g., provided by the output module 518), one or more electronic messages (e.g., text message, email, etc.), and/or the feature combination recommendation may be provided to one or more remote systems (e.g., design systems, manufacturing systems, crowdsource feedback collections systems, etc.) as part of a feedback procedure for updating design model (e.g., the feedback procedure 310).

Figure 8:
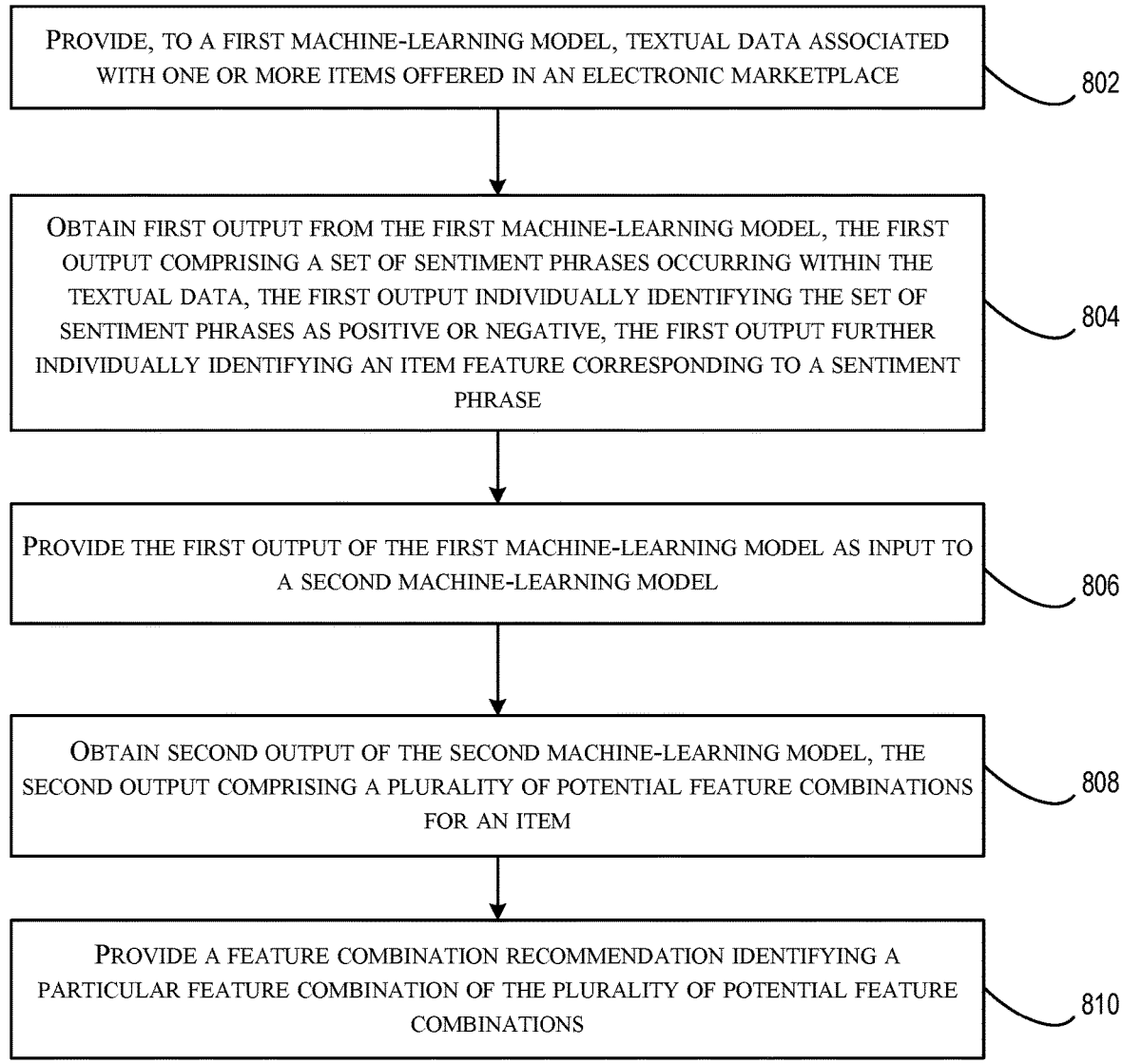
FIG. 8 is yet another flowchart illustrating yet another example method for providing a feature combination recommendation utilizing a design engine, in accordance with at least one embodiment.

FIG. 8 is yet another flowchart illustrating yet another example method 800 for providing a feature combination recommendation utilizing a design engine 501 of FIG. 5, in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by any suitable combination of the modules 502 of the design engine 501 of FIG. 5 which may operate in whole or in part on a user device (e.g., one or more of the user device(s) 404 of FIG. 4) and/or the service provider computer(s) 410 of FIG. 4.

The method 800 may begin at 802, where textual data associated with one or more items offered in an electronic marketplace may be provided (e.g., by the sentiment analysis module 522) to a first machine-learning model (e.g., the sentiment model 202 of FIG. 2). By way of example, a number of reviews (e.g., reviews 106, 110, 112 of FIG. 1) may be identified by the sentiment analysis module 522 and provided to the sentiment model 202 (e.g., a recurrent neural network). The reviews may correspond to a particular item (e.g., wireless headphones X). The sentiment model 202 may have been previously trained (e.g., by the sentiment model manager 520) to identify positive and/or negative sentiment phrases from inputted textual data.

At 804, first output may be obtained from the first machine-learning model (e.g., the sentiment model 202. In some embodiments, the first output may be obtained by the sentiment mapping module 524 and/or by the design management module 516 of FIG. 5. In some embodiments, the first output (e.g., output 222 of FIG. 2) may comprise a set of sentiment phrases occurring within the textual data. The first output may individually identify the set of sentiment phrases as being positive or negative, as having a degree of positivity or negativity, and/or as being associated with a likelihood that the sentiment phrases are positive or negative. Although not depicted in FIG. 2, the first output may individually identify an item feature corresponding to a sentiment phrase. An item feature may include any attribute that describes an item (or a similar item). The item feature may be identified (e.g., by the sentiment mapping module 524 of FIG. 5) from a feature set associated with one or more items. The particular feature set and/or particular features of the feature set may depend on the item and/or item categories/subcategories for which potential feature combinations are being identified. For example, a feature set corresponding to "wireless headphones" may be different than a feature set related to a particular wireless headphone (e.g., wireless headphone X). Such features sets may differ from a feature set corresponding to "kitchen utensils," which may also differ from a feature set associated with "teddy bears."

At 806, the first output (e.g., output 222 of FIG. 2) of the first machine-learning model may be provided (e.g., by the design model manager 530) as input to a second machine-learning model (e.g., the design model 302 of FIG. 3). As discussed above, the first output (e.g., the output 222) may include positive and negative sentiment phrases which may, or may not, be scored and/or ranked according to sentiment scores corresponding to each sentiment phrase of the first output and/or according to features to which each sentiment phrase relates.

At 808, second output of the second machine-learning model (e.g., the design model 302 of FIG. 3) may be obtained. In some embodiments, the second output may comprise a plurality of potential feature combinations for an item. As a non-limiting example, given the first output corresponding to sentiment phrases (e.g., the output 222 of FIG. 2), the design model 302 may identify second output that indicates at least one potential feature combination. By way of example, a potential feature combination identified from the output 222 may indicate that a new item design could include current noise cancelling features and battery aspects of wireless headphone X, as well as being lighter and cheaper than wireless headphone X. Another potential feature combination could indicate that a new design could include current adaptive noise cancelling aspects associated with wireless headphone X, but also include a replaceable battery given that the lack of the ability to replace the battery was previously criticized as indicated in the output 222. As yet another example, a potential feature combination may indicate that a new item could include a similar folding design as wireless headphone X, but also includes controls for a microphone. In general, a potential feature combination may include any suitable number potential features.

At 810, a feature combination recommendation may be provided (e.g., by the output module 518). In some embodiments, the feature combination recommendation may identify a particular feature combination (or a number of feature combinations) of the plurality of potential feature combinations.

It should be appreciated that the examples and/or methods provided herein may be equally applicable for identifying potential feature combinations when the input is not a particular item, but rather an item category and/or an item subcategory. For example, item categories could include "kitchen appliances," "electronics," "automobiles," etc. Sub-categories for "kitchen appliances" could include "stoves," "dishwashers," "toasters," "microwaves," and the like. Sub-categories for "electronics," may include "DVD players," "speakers," "headphones," "phones," and the like. Sub-categories for "automobiles" may include "trucks," "cars," "sedans," "coupes," "vans," "Brand T vehicles," "vehicles manufactured in 1999," and the like.

If potential feature combinations are to be identified for a category/subcategory, then content data (e.g., reviews, blogs, social media posts, articles, electronic content, etc.) may be identified based on the category/subcategory rather than a particular item as the example in FIG. 8. Thus, positive and negative sentiment phrases may be identified across items. As a non-limiting example, reviews from wired headphones as well as wireless headphones may be utilized to identify sentiment phrases. Accordingly, these identified sentiment phrases may be mapped to a feature set which may include a superset of the features of the items associated with a category/subcategory. The design model may then utilize the sentiment phrases and corresponding features to identify potential feature combinations. The potential feature combinations identified in this example, may include features associated with one or more items in a category. By enabling this type of feature identification from features associated with items of a category/subcategory, the design model 302 may effectively be trained to "think outside the box." That is, to consider features of a broader group of items (e.g., headphones) rather than features of a particular category/subcategory (e.g., wireless headphones). Accordingly, the potential feature combinations identified from a large group of items may be more plentiful and more varied than potential feature combinations identified from a particular item (or at least a smaller group of items).

Figure 9:
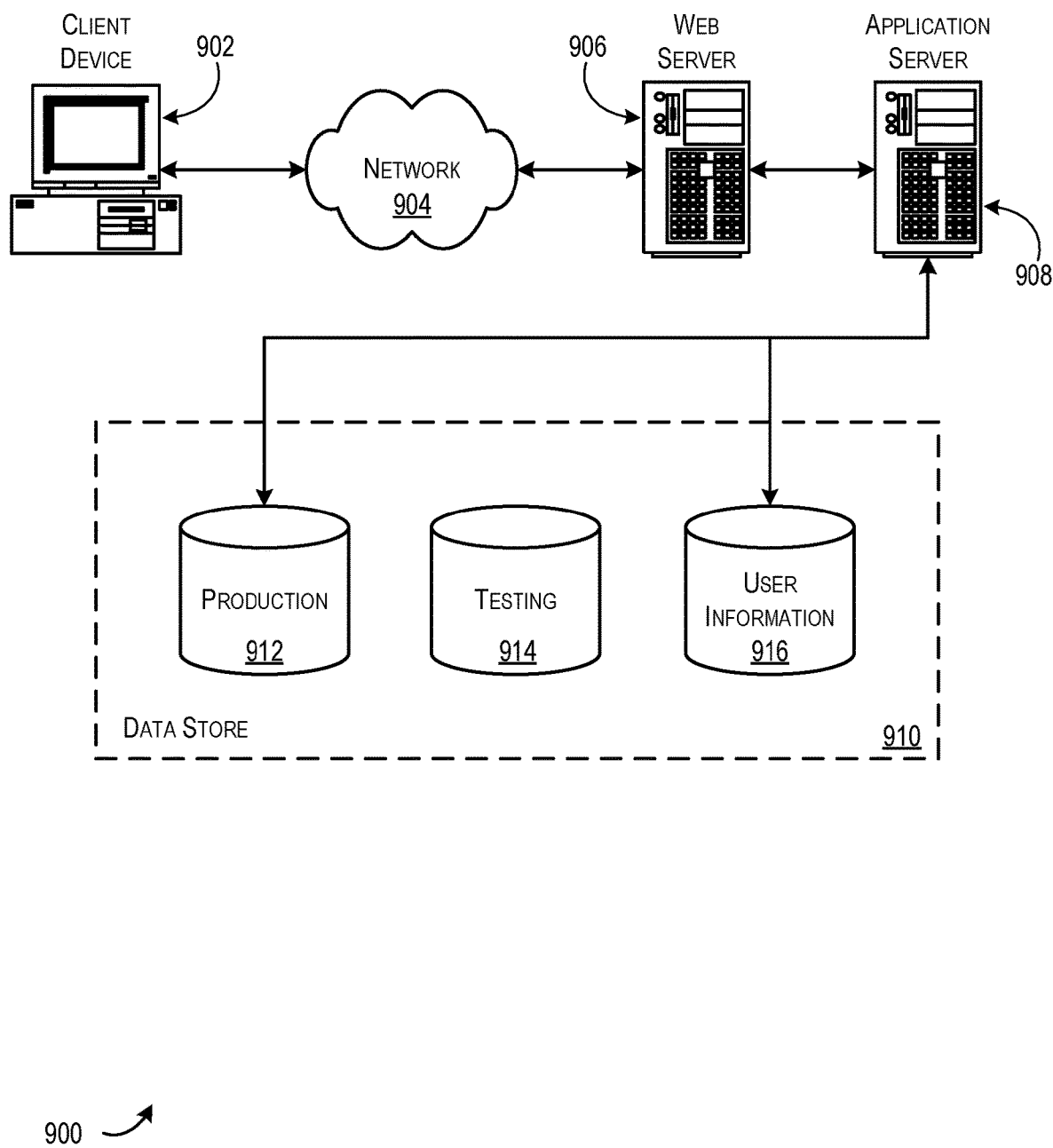
FIG. 9 illustrates an environment in which various embodiments can be implemented.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes a user device 902, which can include any appropriate device operable to send and receive requests, messages, or information over an appropriate network 904 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, by a computing device, a plurality of instances of textual data associated with one or more items offered in an electronic catalog;
   identifying, utilizing a neural network, a set of sentiment phrases within the plurality of instances of textual data, the set of sentiment phrases individually corresponding to one or more features of the one or more items;
   generating sentiment scores for the set of sentiment phrases based at least in part on at least one of: a sentiment polarity or the one or more features to which the set of sentiment phrases individually correspond;
   generating, utilizing a machine-learning model, a plurality of potential feature combinations for a new item, the machine-learning model utilizing an exploration-exploitation algorithm and reinforced learning techniques to generate the plurality of potential feature combinations, wherein the plurality of potential feature combinations are identified by the machine-learning model based at least in part on one or more of the set of sentiment phrases and the sentiment scores;
   obtaining a plurality of known feature combinations corresponding to the one or more items offered in the electronic catalog;
   calculating a score for each of the plurality of potential feature combinations generated by the machine-learning model, the score indicating an amount of difference between a potential feature combination of the plurality of potential feature combinations and the plurality of known feature combinations corresponding to the one or more items;
   selecting a particular feature combination from the plurality of potential feature combinations, the particular feature combination being selected based at least in part on the score; and
   providing a feature combination recommendation identifying the particular feature combination.

2. The computer-implemented method of claim 1, further comprising:
   receiving feedback related to the feature combination recommendation, the feedback indicating a degree by which features of the of the particular feature combination are combinable; and
   updating the machine-learning model based at least in part on the feedback.

3. The computer-implemented method of claim 1, wherein the neural network identifies the set of sentiment phrases and one or more features corresponding to each sentiment phrase.

4. The computer-implemented method of claim 1, wherein the set of sentiment phrases comprises a subset of positive sentiment phrases and a subset of negative sentiment phrases, and wherein the method further comprises:
   generating a ranked subset of positive sentiment phrases and a ranked subset of negative sentiment phrases; and
   identifying the one or more of the set of sentiment phrases to be utilized as input for the machine-learning model, wherein the one or more of the set of sentiment phrases are identified based at least in part on the ranked subset of positive sentiment phrases and the ranked subset of negative sentiment phrases.

5. The computer-implemented method of claim 1, wherein at least one feature of the one or more features of the one or more items is identified from an image.

6. The computer-implemented method of claim 1, wherein the machine-learning model utilizes historical data comprising one or more previously-known feature combinations that have been identified as being desirable to generate the plurality of potential feature combinations.

7. The computer-implemented method of claim 1, wherein the machine-learning model utilizes a multi-armed bandit algorithm that is configured to maximize an expected gain utilizing the reinforced learning techniques.

8. A computing device, comprising:
   a processor; and
   a memory storing computer-readable instructions that, upon execution by the processor, configure the computing device to:
   identify, utilizing a neural network, a set of sentiment phrases within a plurality of instances of textual data, the set of sentiment phrases individually corresponding to a set of features associated with one or more items offered in an electronic catalog, the set of sentiment phrases having associated sentiment scores;
   generate, utilizing a machine-learning model, a plurality of potential feature combinations for an item based at least in part on a subset of the set of sentiment phrases and the sentiment scores, wherein the machine-learning model utilizes an exploration-exploitation algorithm and reinforced learning techniques to generate the plurality of potential feature combinations;

obtain a plurality of known feature combinations corresponding to the one or more items offered in the electronic catalog;

score the plurality of potential feature combinations generated by the machine-learning model based at least in part on an amount of difference between each potential feature combination of the plurality of potential feature combinations and the plurality of known feature combinations corresponding to the one or more items; and provide a feature combination recommendation identifying a particular feature combination of the plurality of potential feature combinations, the particular feature combination of the plurality of potential feature combinations being provided based at least in part on the score.

9. The computing device of claim 8, wherein the computing device is further configured to:

receive sales data related to the particular feature combination; and update the machine-learning model based at least in part on the sales data received.

10. The computing device of claim 8, wherein the computing device is further configured to:

identify a set of positive features based at least in part on the set of sentiment phrases; and identify a set of negative features based at least in part on the set of sentiment phrases, wherein the machine-learning model is configured to utilize as input at least one of the set of positive features and at least one of the set of negative features to generate the plurality of potential feature combinations.

11. The computing device of claim 8, wherein the machine-learning model is configured to utilize the subset of the set of sentiment phrases as input to generate the plurality of potential feature combinations for the item.

12. The computing device of claim 8, wherein the neural network is a recurrent neural network configured to identify sentiment phrases from text.

13. The computing device of claim 8, wherein the computing device is further configured to map each of the set of sentiment phrases to one or more features of a plurality of features, the plurality of features corresponding to a superset of features of the one or more items, wherein the machine-learning model utilizes the one or more features and a corresponding positive or negative sentiment indication as input.

14. The computing device of claim 8, wherein the particular feature combination is selected for the feature combination recommendation based at least in part on the score for the particular feature combination indicating that the particular feature combination exceeds a threshold difference amount with respect to the known feature combinations of the one or more items.

15. A non-transitory computer-readable storage medium having stored thereon computer-executable instructions that, when executed by one or more processors, cause the one or more processors to perform operations comprising:

providing, to a first machine-learning model, textual data associated with one or more items offered in an electronic catalog;

obtaining first output from the first machine-learning model, the first output comprising a set of sentiment phrases occurring within the textual data, the first output individually identifying the set of sentiment phrases as positive or negative, the first output further individually identifying an item feature corresponding to a sentiment phrase;

providing the first output of the first machine-learning model as input to a second machine-learning model, the second machine-learning model utilizing an exploration-exploitation algorithm and reinforced learning techniques to generate a plurality of potential feature combinations for an item;

obtaining a second output of the second machine-learning model, the second output comprising the plurality of potential feature combinations for the item;

obtaining a plurality of known feature combinations corresponding to the item;

selecting a particular feature combination from the plurality of potential feature combinations based at least in part on scoring the plurality of potential feature combinations generated by the second machine-learning model based at least in part on an amount of difference between each potential feature combination of the plurality of potential feature combinations and the plurality of known feature combinations corresponding to the item; and providing a feature combination recommendation identifying the particular feature combination selected from the plurality of potential feature combinations, the particular feature combination being provided based at least in part on the scoring.

16. The non-transitory computer-readable storage medium of claim 15, wherein the set of sentiment phrases comprise positive sentiment phrases and negative sentiment phrases.

17. The non-transitory computer-readable storage medium of claim 15, wherein each sentiment phrase in the set of sentiment phrases is identified as positive or negative based at least in part on a non-integer value.

18. The non-transitory computer-readable storage medium of claim 15, wherein the one or more items are related by an item category associated with the electronic catalog.

19. The non-transitory computer-readable storage medium of claim 18, wherein at least one negative sentiment is utilized in the input to the second machine-learning model.

* * * * *